INVENTOR.
WELLINGTON P. McLEAN
BY Wells + St John
ATTYS.

Dec. 21, 1965   W. P. McLEAN   3,224,032
CASTER
Filed June 25, 1964   2 Sheets-Sheet 2

INVENTOR.
WELLINGTON P. McLEAN
BY *Wells & St. John*
ATTYS.

_United States Patent Office_

3,224,032
Patented Dec. 21, 1965

3,224,032
CASTER
Wellington P. McLean, 6630 Old Barber Road,
Boise, Idaho
Filed June 25, 1964, Ser. No. 377,900
5 Claims.  (Cl. 16—26)

This invention relates to a universal ball bearing caster to be used for the purpose of supporting various devices for movement over floors and the like. Articles of furniture, pallets, dollies and the like are examples of devices where casters are often needed to make it easy to move them.

It is the purpose of this invention to provide an improved caster wherein a single cylindrical ring provides the mounting body to be attached to the device to be supported and this ring mounts two vertically spaced rows of ball bearings which confine a large sphere or ball between them, the parts being such that the ball bearings are adjustable to allow the large ball to be put in place and to be adjusted up and down for final levelling of the device supported.

The nature and advantages of the invention will appear more fully from the following description and the accompanying drawings wherein a preferred form of the invention is shown. It should be understood, however, that the drawings and description are intended to be descriptive only and are not intended to limit the invention in scope beyond the limitations of the claims. Minor changes may be made from the exact details shown and described.

Figure 1:
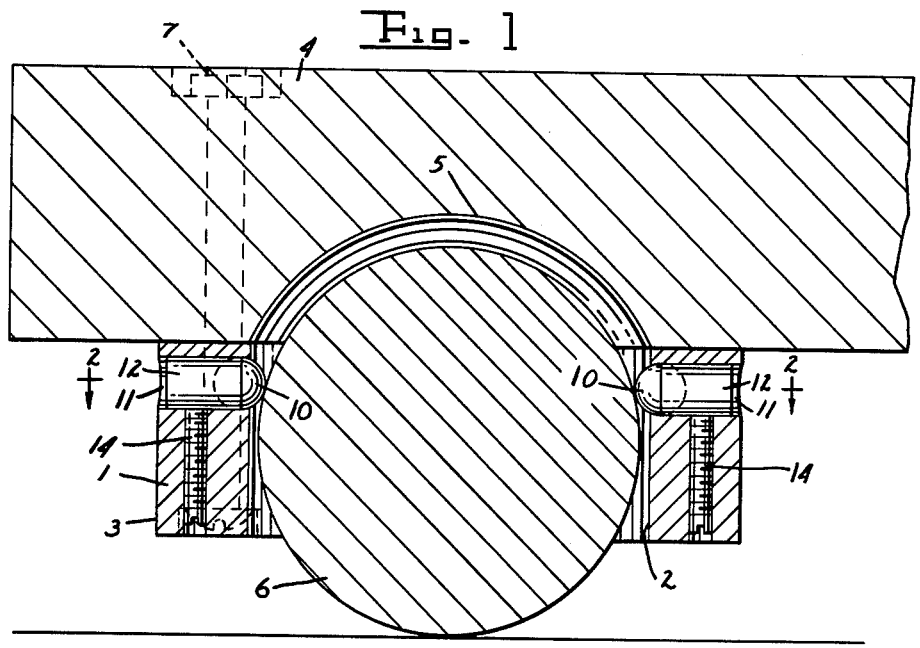
FIGURE 1 is a vertical sectional view through a universal ball bearing caster embodying the invention and showing a corner of a dolly or the like to which the caster is attached.

Referring now in detail to the drawings the invention is shown as embodying a ring 1 of suitable material. The ring 1 has a cylindrical interior surface 2, and for convenience the exterior surface 3 is also cylindrical. The ring 1 is adapted to be fastened to the under surface of the device 4, which is to be supported by the caster. As shown, the device 4 is hollowed out at 5 to receive a caster sphere 6 that supports the load. Any suitable means, such as a pair of screw bolts 7 going through apertures 8 drilled in the ring body 1, can be used to secure the caster to the device 4. The ring body 1 is shown as recessed at 9 around the lower ends of the apertures 8 to set in the bolt heads.

The caster sphere 6 is slightly smaller in diameter than the cylindrical inner surface 2 of the ring 1 so that it will readily pass through the ring 1. The sphere 6 is mounted in the ring 1 by a plurality of ball bearings 10. Any suitable number of these bearings may be provided. Where the loading is heavy it is desirable to increase the number of the ball bearings. These ball bearings are mounted in two parallel rows perpendicular to the axis of the ring 1 by providing holes 11 in the ring at spaced intervals about the ring. In each hole a plug 12 is provided outwardly of the bearing and this plug 12 has its inner end formed with a spherical recess 13 to receive the ball bearing. The plugs are secured in place by set screws 14 that are threaded into the ring 1 from one face thereof. Any other suitable means for securing the plugs in place can be used. It must provide for endwise adjustment of the plugs 12. It must also be adequate to hold the plug against the pressure that is exerted endwise of the plug when a load is pressing down on the caster.

Figure 2:
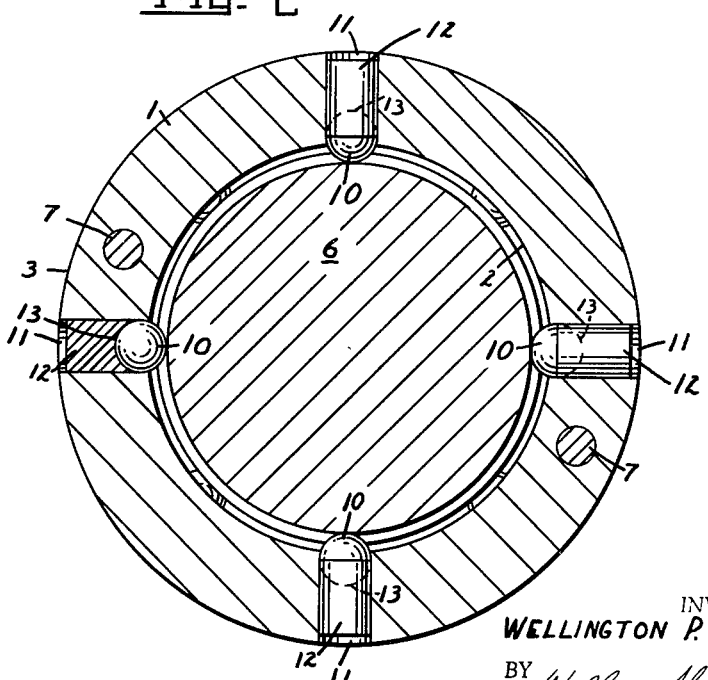
FIGURE 2 is a sectional view taken on the line 2—2 of FIGURE 1.
Figure 3:
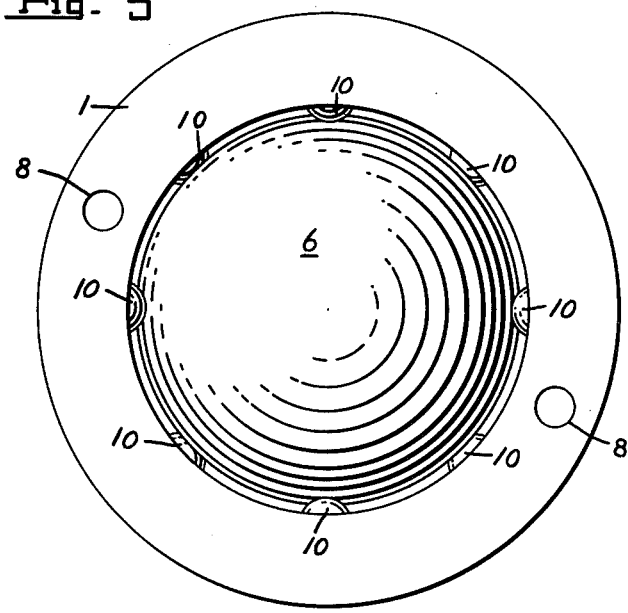
FIGURE 3 is a top plan view of the caster removed from the device supported.
Figure 4:
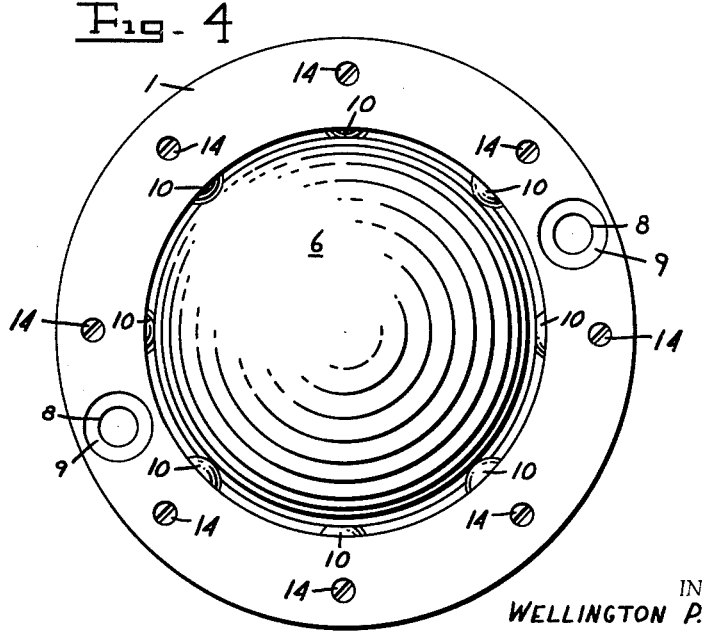
FIGURE 4 is a bottom plan view of the caster.

The upper row of holes 11 has the ball bearings 10 seated therein so as to protrude inwardly beyond the inner surface 2 of the ring, as shown in FIGURES 1 and 2, far enough to provide an upper bearing on which the caster sphere 6 bears. Then the lower row of ball bearings 10 are set to hold the sphere 6 in place. The ball bearings can be set in more or less for the most desirable position. Normally the upper row of ball bearings 10 would be set in as far as possible to still have them at least half way in holes 11 in order to take the upward thrust from the sphere 6, and the ball bearings 10 in the lower row are set in only far enough to prevent the sphere 6 from dropping out.

A certain amount of height adjustment is obtainable with this caster assembly. The upper bearings 10 can be moved outward and the lower bearings 10 moved inward to lower the ring 1 with respect to the sphere 6 and thus bring the device 4 closer to the surface over which it is moved.

The device 4 is shown as being cut out at 5 to bring it as close as possible to the surface on which the sphere 6 rolls. Where height is not so critical the ring 1 can be made deeper or the device may be set on shims (not shown) and the bolts 7 made long enough to secure the device by passing through the shims.

By use of the cylindrical ring or housing 1 with upper and lower rows of ball bearings radially adjustable therein and the staggering of the bearings in the upper row with respect to those in the lower row, it is possible to provide a very strong reliable caster with bearing adjustment to take care of bearing wear and height of support of the device mounted on the casters. If there is wear the loose play is readily taken up by moving the lower bearings 10 inward. Or the upper row of bearings 10 can be moved in where they have not already been set in as far as possible.

This mounting allows the spheres 6 to roll in any direction so that a device mounted on a plurality of these casters can turn or move in any horizontal direction at any time. The making of the device is simplified since the holes 11 are radial with respect to the ring 1 and the set screws 14 run parallel to the axis of the ring 1. The bolt holes 8 are also parallel to the axis of the ring 1.

It is believed that the nature and advantages of my invention will be clear from the foregoing description.

Having described the invention, I claim:

1. A universal ball bearing caster comprising: a ring having means to secure it to the device to be supported, the ring having a cylindrical interior surface;
a sphere slidable axially of the ring and substantially filling it;
a plurality of spaced apart apertures being provided in said ring and arranged in a plane perpendicular to the axis of said cylindrical surface;
ball bearings seated in said apertures and extending inwardly from the apertures into contact with said sphere and limiting upward movement of the sphere within the ring and supporting the ring on said sphere;
a second group of spaced apart apertures being provided in said ring and arranged in a plane parallel to the plane of said first apertures but spaced below said first apertures;
ball bearings seated in the apertures of said second group and extending inwardly from such apertures and limiting downward movement of the sphere within the ring;
each of the apertures having a plug therein against which the bearing rests; and
means carried by the ring engaging each plug to hold it against outward movement radially of the ring.

2. The device defined in claim 1 wherein said plugs have spherical seats receiving said ball bearings.

3. The device defined in claim 1 wherein the last named means comprises a set screw extending axially of the ring to each said aperture and threaded in the ring.

4. A universal ball bearing caster comprising: a ring having means to secure it to the device to be supported, the ring having a cylindrical interior surface;

a sphere slidable axially of the ring and substantially filling it;

a plurality of spaced apart apertures being provided in said ring and arranged in a plane perpendicular to the axis of said cylindrical surface;

ball bearings seated in said apertures and extending inwardly from the apertures into contact with said sphere and limiting upward movement of the sphere within the ring and supporting the ring on said sphere;

a second group of spaced apart apertures being provided in said ring and arranged in a plane parallel to the plane of said first apertures but spaced below said first apertures;

ball bearings seated in the apertures of said second group and extending inwardly from such apertures and limiting downward movement of the sphere within the ring;

each of the apertures having a plug therein against which the bearing rests;

said plugs being adjustable lengthwise in their respective apertures; and means carried by the ring engaging each plug to secure it against outward movement lengthwise of the aperture from its adjusted position.

5. The device defined in claim 4 wherein the means to secure each plug comprises a set screw extending from one end of the ring to the respective aperture.

References Cited by the Examiner
FOREIGN PATENTS 22,370 12/1861 Germany.
8,017 6/1886 Great Britain.

DONLEY J. STOCKING, *Primary Examiner.*